(12) United States Patent
Ishii

(10) Patent No.: US 11,381,736 B2
(45) Date of Patent: Jul. 5, 2022

(54) IMAGE CAPTURE APPARATUS AND CONTROL METHOD

(71) Applicant: CANON KABUSHIKI KAISHA, Tokyo (JP)

(72) Inventor: Shinya Ishii, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/196,597

(22) Filed: Mar. 9, 2021

(65) Prior Publication Data

US 2021/0289126 A1 Sep. 16, 2021

(30) Foreign Application Priority Data

Mar. 10, 2020 (JP) .............................. JP2020-041216

(51) Int. Cl.
*H04N 5/232* (2006.01)
(52) U.S. Cl.
CPC ... *H04N 5/23219* (2013.01); *H04N 5/232121* (2018.08); *H04N 5/232933* (2018.08)
(58) Field of Classification Search
CPC .. G06F 3/04883; G06F 3/0412; G06F 3/0416; G06F 3/0484; G06F 3/0488; G06F 3/048; G06F 2203/04106; H04N 5/23219; H04N 5/232933; H04N 5/232121
USPC ................................................... 348/333.01
See application file for complete search history.

(56) References Cited

U.S. PATENT DOCUMENTS

| 10,530,989 | B2* | 1/2020 | Shiozaki | H04N 5/232933 |
| 10,623,647 | B2* | 4/2020 | Ishitsuka | H04N 5/232935 |
| 11,012,625 | B2* | 5/2021 | Ueda | H04N 5/232933 |
| 11,039,073 | B2* | 6/2021 | Sasai | G06F 3/04883 |
| 11,061,558 | B2* | 7/2021 | Hua | G06F 3/0484 |
| 2017/0195553 | A1* | 7/2017 | Shiozaki | H04N 5/23245 |
| 2018/0198985 | A1* | 7/2018 | Ishitsuka | H04N 5/232935 |
| 2018/0324351 | A1* | 11/2018 | Yoshimoto | G06F 3/04883 |
| 2020/0004379 | A1* | 1/2020 | Iwagami | G06F 3/0418 |
| 2020/0007749 | A1* | 1/2020 | Izuoka | G06F 3/04883 |
| 2020/0007752 | A1* | 1/2020 | Yoshida | G06F 3/0482 |
| 2020/0007753 | A1* | 1/2020 | Kamiya | H04N 5/22525 |
| 2020/0007786 | A1* | 1/2020 | Ueda | G06F 3/0485 |

FOREIGN PATENT DOCUMENTS

JP 2012-089973 A 5/2012
JP 2016-212805 A 12/2016

* cited by examiner

*Primary Examiner* — Pritham D Prabhakher
(74) *Attorney, Agent, or Firm* — Cowan, Liebowitz & Latman, P.C.

(57) ABSTRACT

An image capture apparatus performs control such that when an approaching to a finder is not made, a touch operation with an area that is less than a first threshold on the touch operation surface is validated, and a touch operation with an area that is not less than the first threshold on the touch operation surface is invalidated, when the approaching to the finder is made, the touch operation with the area that is not less than the first threshold on the touch operation surface is validated even if the touch operation has the area that is not less than the first threshold on the touch operation surface.

12 Claims, 11 Drawing Sheets

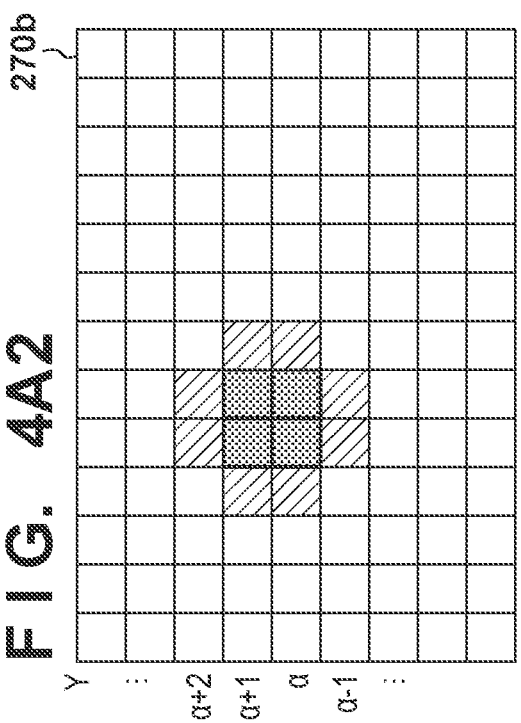
FIG. 4A1
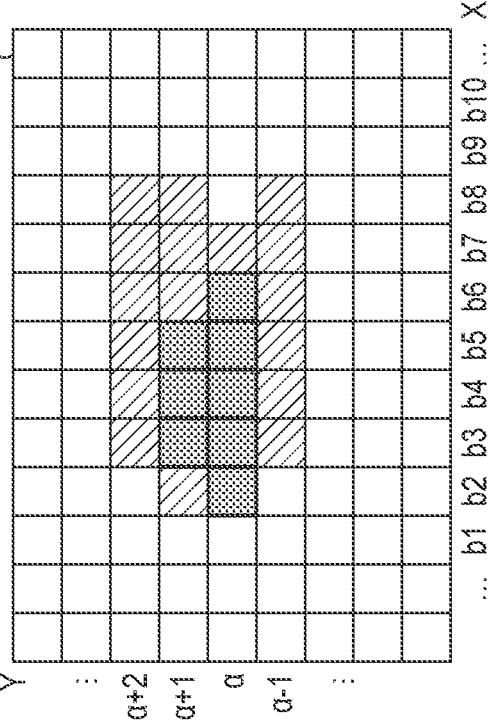
FIG. 4A2
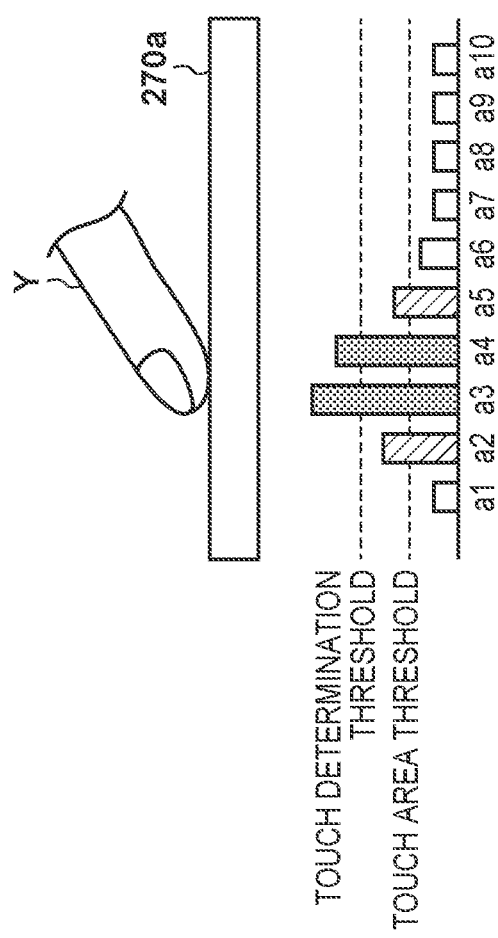
FIG. 4B1
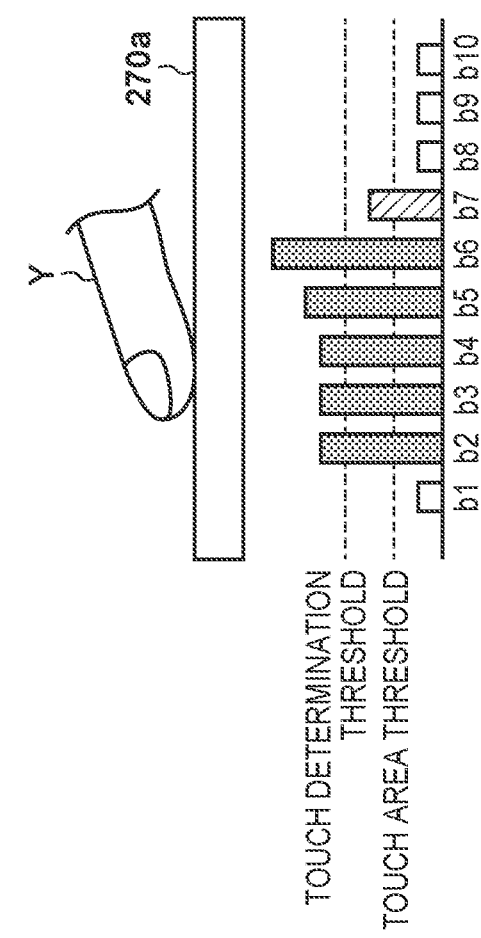
FIG. 4B2

FIG. 6A1
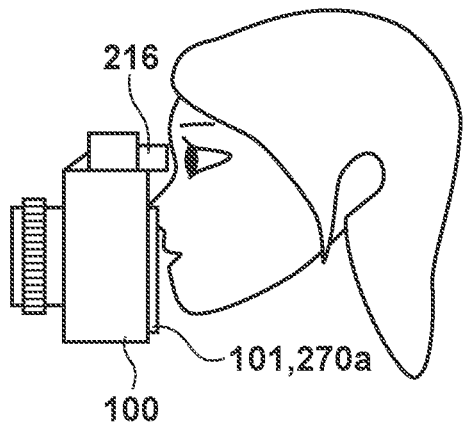
FIG. 6B1
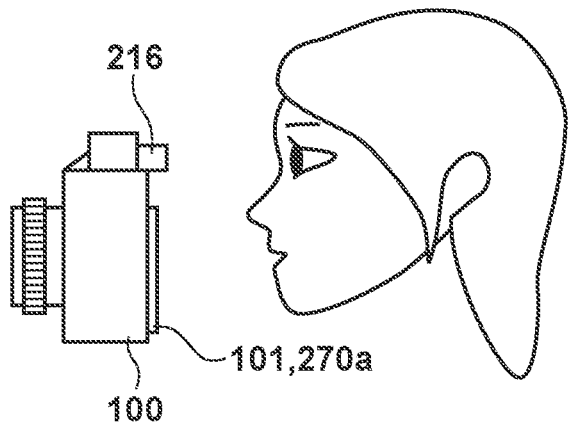
FIG. 6A2
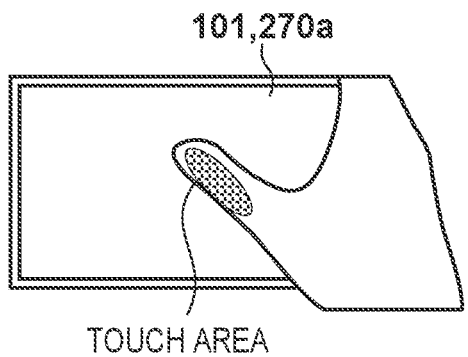
FIG. 6B2
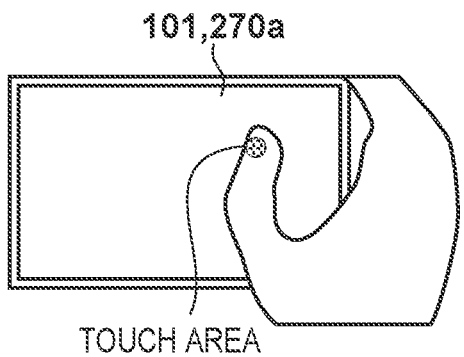
FIG. 7
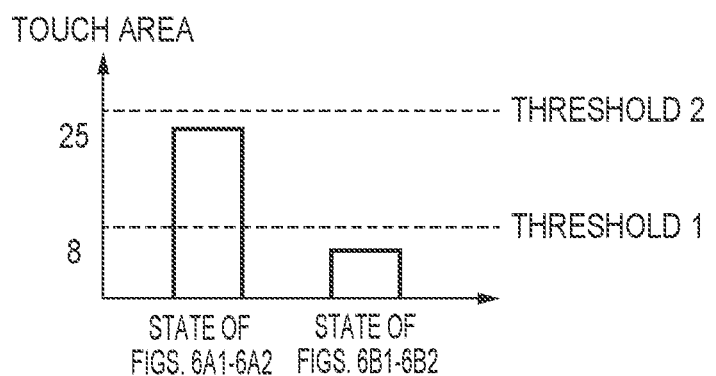

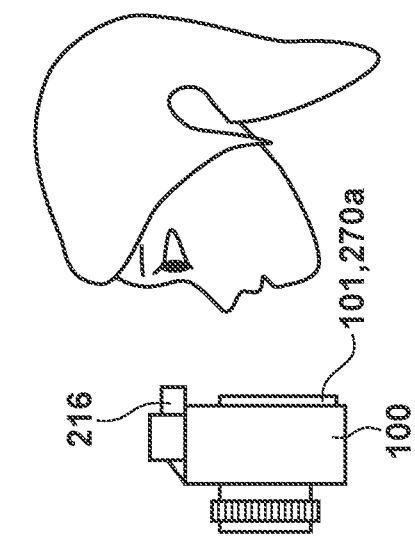
FIG. 9A1
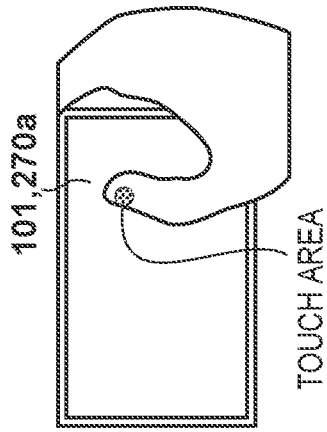
FIG. 9A2
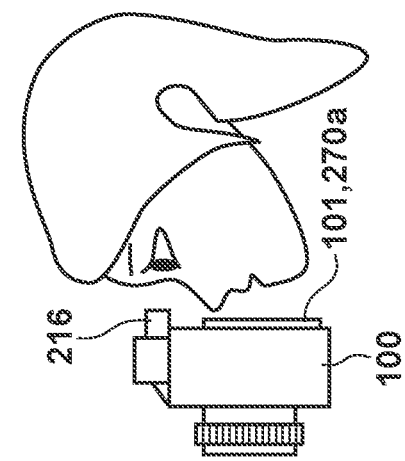
FIG. 9B1
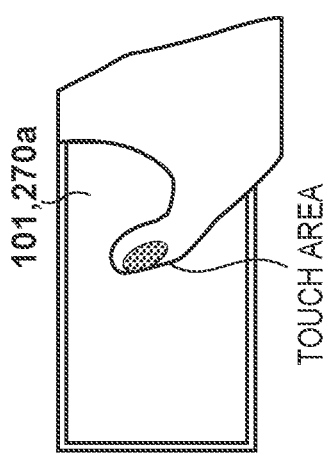
FIG. 9B2
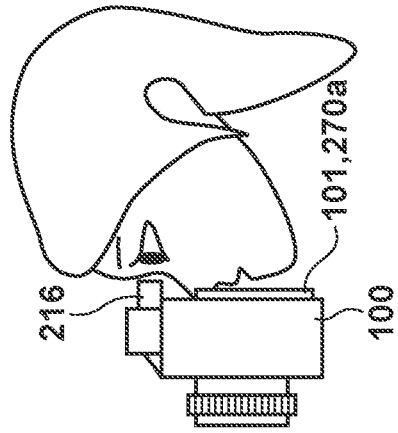
FIG. 9C1
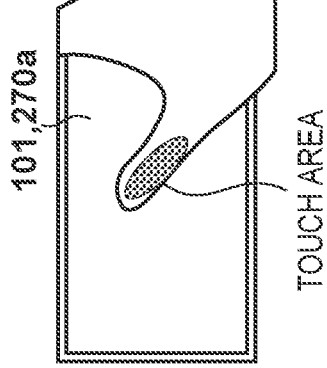
FIG. 9C2

IMAGE CAPTURE APPARATUS AND CONTROL METHOD

BACKGROUND OF THE INVENTION

Field of the Invention

The present invention relates to a technique for detecting a touch operation.

Description of the Related Art

In a device that accepts an input from a user by a touch operation on a touch panel, processing by a touch operation unintended by the user may be performed in response to detection of an inadvertent touch operation on the touch panel. In order to suppress such a malfunction, a method has been proposed in which when the touch area is larger than a threshold, processing by the touch operation is not performed (Japanese Patent Laid-Open No. 2016-212805). In addition, a method of operating a touch pad provided at a position different from a display unit (finder) on which a user is viewing when a user performs a touch operation has been proposed (Japanese Patent Laid-Open No. 2012-089973).

Although the conventional techniques can suppress an operation unintentionally input when carrying a device, an operability may deteriorate when using the device, such as when shooting with a camera. For example, if the area of the touch input to be invalidated at the time of the touch pad operation in an eye approaching state as disclosed in Japanese Patent Application Laid-Open No. 2012-089973 is made too small, if the touch operation is performed with the touch input having a large touch area, even if the touch operation is intentionally performed by the user, the touch operation is invalidated.

SUMMARY OF THE INVENTION

The present invention has been made in consideration of the aforementioned problems, and realizes techniques that can reduce a possibility of performing processing due to a touch operation unintended by a user and improve an operability of a device.

In order to solve the aforementioned problems, the present invention provides an image capture apparatus comprising: an approach detection unit configured to detect an approaching to a finder; a touch detecting unit configured to detect a touch operation on a touch operation surface provided outside the finder; and a control unit configured to perform control such that when the approaching to the finder is not made, a touch operation with an area that is less than a first threshold on the touch operation surface is validated, and a touch operation with an area that is not less than the first threshold on the touch operation surface is invalidated, and when the approaching to the finder is made, the touch operation with the area that is not less than the first threshold on the touch operation surface is validated even if the touch operation has the area that is not less than the first threshold on the touch operation surface.

In order to solve the aforementioned problems, the present invention provides a method of controlling an image capture apparatus having an approach detection unit configured to detect an approaching to a finder, and a touch detecting unit configured to detect a touch operation on a touch operation surface provided outside the finder, the method comprising: performing control such that when the approaching to the finder is not made, a touch operation with an area that is less than a first threshold on the touch operation surface is validated, and a touch operation with an area that is not less than the first threshold on the touch operation surface is invalidated, and when the approaching to the finder is made, the touch operation with the area that is not less than the first threshold on the touch operation surface is validated even if the touch operation has the area that is not less than the first threshold on the touch operation surface.

In order to solve the aforementioned problems, the present invention provides a non-transitory computer-readable storage medium storing a program for causing a computer to function as the following units of an image capture apparatus, wherein an approach detection unit is configured to detect an approaching to a finder, a touch detecting unit is configured to detect a touch operation on a touch operation surface provided outside the finder, and a control unit is configured to perform control such that when the approaching to the finder is not made, a touch operation with an area that is less than a first threshold on the touch operation surface is validated, and a touch operation with an area that is not less than the first threshold on the touch operation surface is invalidated, and when the approaching to the finder is made, the touch operation with the area that is not less than the first threshold on the touch operation surface is validated even if the touch operation has the area that is not less than the first threshold on the touch operation surface.

According to the present invention, it is possible to reduce the possibility of performing processing due to the touch operation unintended by the user and improve the operability of the device.

Further features of the present invention will become apparent from the following description of exemplary embodiments (with reference to the attached drawings).

BRIEF DESCRIPTION OF THE DRAWINGS

FIGS. 4A1, 4A2, 4B1 and 4B2 are diagrams illustrating calculation processing of a touch area of the present embodiment.

FIGS. 6A1, 6A2, 6B1 and 6B2 are diagrams illustrating a relationship between an eye approaching distance and a touch area of the first embodiment.

FIG. 7 is a diagram illustrating a relationship between an eye approaching distance, a touch area and a touch determination threshold of the first embodiment.

FIGS. 9A1, 9B1, 9C1, 9A2, 9B2 and 9C2 are diagrams illustrating a relationship between an eye approaching distance and a touch area of the second embodiment.

DESCRIPTION OF THE EMBODIMENTS

Figure 1A:
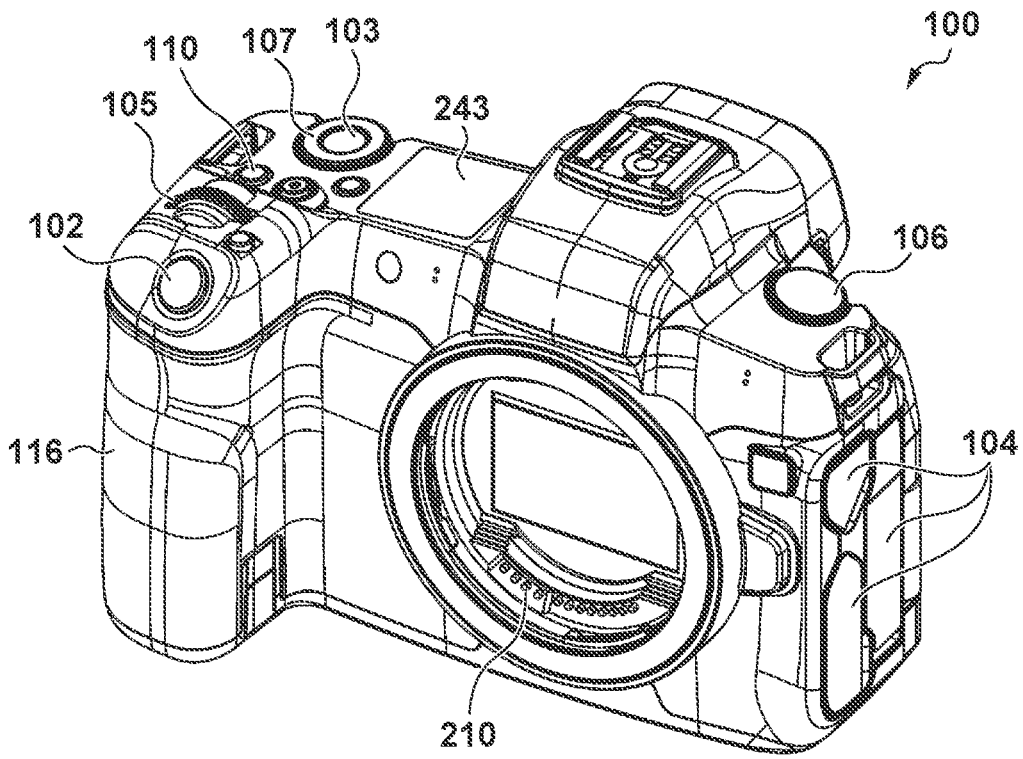
FIGS. 1A and 1B are external views of a digital camera of a present embodiment.

An exemplary embodiment of the present invention will be described in detail below with reference to the accompanying drawings. It is to be noted that the following exemplary embodiment is merely one example for implementing the present invention and can be appropriately modified or changed depending on individual constructions and various conditions of apparatuses to which the present invention is applied. Thus, the present invention is in no way limited to the following exemplary embodiment. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

Hereinafter, embodiments in which an image capture apparatus of the present invention is applied to a single-lens reflex digital camera capable of shooting a still image and/or a moving image will be described in detail with reference to the accompanying drawings.

<Apparatus Configuration>

Figure 1B:
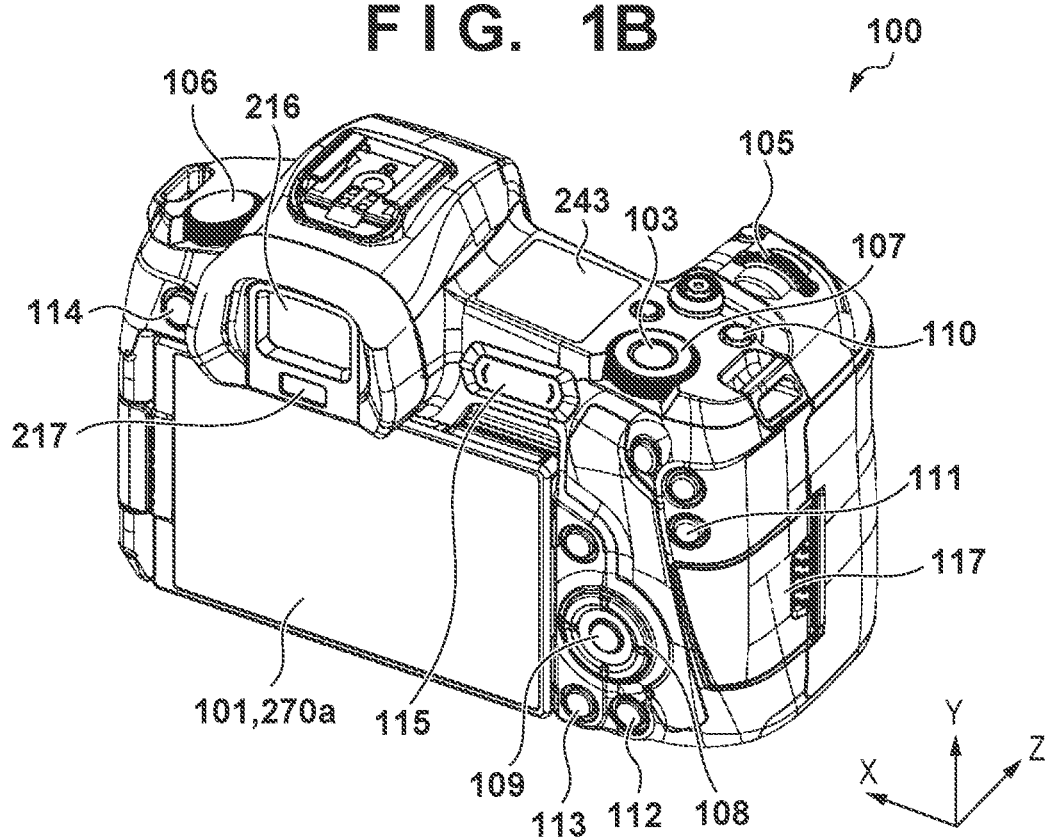
Figure 2:
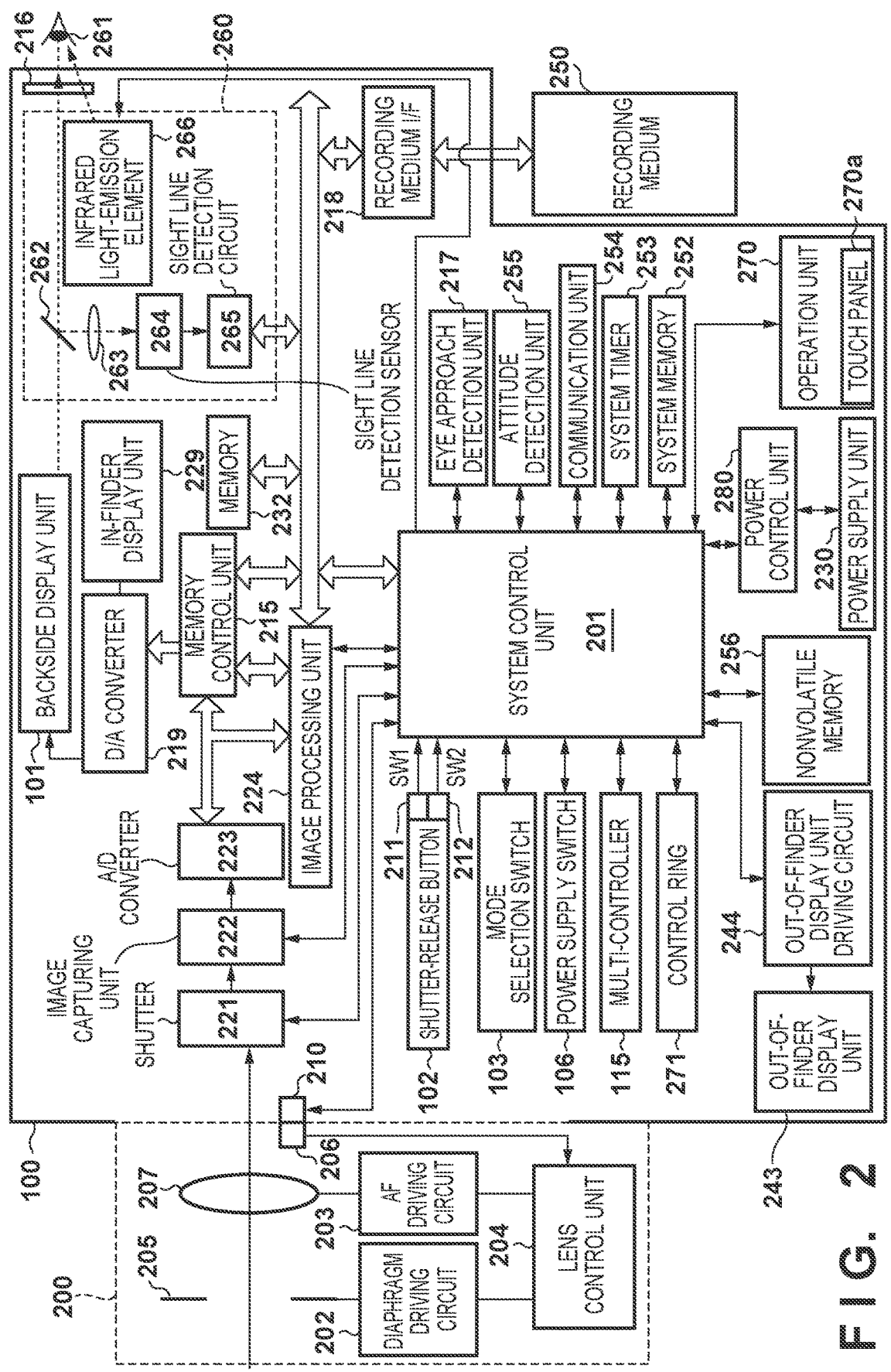
FIG. 2 is a block diagram illustrating a configuration of the digital camera of the present embodiment.

With reference to FIGS. 1A, 1B and 2, the configuration and functions of a digital camera 100 according to the present embodiment will be described.

FIG. 1A is a front perspective view of the digital camera 100 in a state where a lens unit 200 is detached. FIG. 1B is a back perspective view of the digital camera 100.

In FIGS. 1A and 1B, a backside display unit 101 is an out-of-finder display unit for displaying images and various types of information and a display device such as an LCD provided on the back surface of the camera body. Moreover, the backside display unit 101 has a function of reproducing a still image after the still image was shot, a function of displaying a moving image that is being recorded, and a live view display (through-the-lens display) function as well. A touch panel (touch screen) 270a is provided on the backside display unit 101. The touch panel 270a is a touch operation member capable of detecting contact (touch operation) with the display surface (touch operation surface of the touch panel 270a) of the backside display unit 101.

An out-of-finder display unit 243 is a display device provided on the upper surface of the camera body, and displays various setting values of the camera such as a shutter speed and a diaphragm aperture. A shutter-release button 102 is an operation member for giving a shooting instruction. A mode selection switch 103 is a rotating dial type operation member for switching between various modes. A terminal cover 104 is a cover member for protecting a connector (not illustrated) for connecting an external device and the digital camera 100 via a cable such as a USB cable. A main electronic dial 105 is a rotating operation member included in operation units 270 that will be described later with reference to FIG. 2, and by rotating this main electronic dial 105, setting values such as a shutter speed and a diaphragm aperture can be changed.

A power supply switch 106 is an operation member for switching between on/off of the power supply to the digital camera 100. A sub electronic dial 107 is a rotating operation member included in the operation units 270 that will be described later with reference to FIG. 2, and can move a selected frame, scroll images, and/or the like. A cross key 108 is also a movement instruction member included in the operation units 270 that will be described later with reference to FIG. 2, and is a four-directional operation button having push buttons that can be pressed in four directions of up, down, left, and right. The operation can be performed according to the portion of the cross key 108 pressed in the pressed direction. A SET button 109 is also a push button included in the operation units 270 that will be described later with reference to FIG. 2, and is mainly used for determining a selection item and/or the like.

A lock button 110 is also a push button included in the operation units 270 that will be described later with reference to FIG. 2, and in response to the button being pressed, it is possible to switch between setting/releasing of a lock state in which an operation on the main electronic dial 105, the sub electronic dial 107, the touch panel 270a, the multi controller 115, a control ring (not shown), or the like is validated/invalidated.

The control ring is an operation member capable of a rotation operation centered on an optical axis around a lens barrel of the lens unit 200 that will be described later in FIG. 2. When operating the control ring, an electrical pulse signal corresponding to the rotation amount (manipulated variable) is generated, the system control unit 201 controls each component of the digital camera 100 based on the pulse signal. When the function selection button of the control ring is pressed, a menu screen in which the function assigned to the control ring can be changed is displayed on the backside display unit 101. The control ring is used to select setting items and change values.

An enlargement/reduction button 111 is also a push button included in the operation units 270 that will be described later in FIG. 2, during a live view display in a shooting mode, and can turn on/off the enlargement mode, change the enlargement ratio in the enlargement mode, and reduce the image by decreasing the enlargement ratio of the enlarged image. The enlargement/reduction button 111 can enlarge/reduce a reproduced image and increase/decrease the enlargement ratio in a reproduction mode. The delete button 112 is also a push button included in the operation units 270 that will be described later with reference to FIG. 2, and can delete an image file recorded on a recording medium 250 in shooting processing described later. A reproduction button 113 is also an operation member included in the operation units 270 that will be described later in FIG. 2, and can switch the operation mode of the digital camera 100 to the shooting mode or the reproduction mode. A menu button 114 is also a push button included in the operation units 270 that will be described later with reference to FIG. 2, and can display a menu screen on the backside display unit 101. A multi-controller 115 is also included in the operation unit 270 that will be described later with reference to FIG. 2, and is an operation member, i.e., an operation bar, which can be slid in the lateral direction, and can assign various functions to the slide operation and the touch operation at both ends.

A grip portion 116 has a shape that makes it easy to be grasped by a user's a right hand when he or she holds the digital camera 100. The shutter-release button 102 and the main electronic dial 105 are arranged at positions where the grip portion 116 can be operated by the index finger of the right hand while holding the digital camera 100 by gripping the grip portion 116 with the little finger, the ring finger and the middle finger of the right hand. In the same state, the sub electronic dial 107 is arranged at a position operable with the thumb of the right hand. A lid 117 is a member for opening or closing a slot for mounting/removing the recording medium 250 to/from the digital camera 100.

A communication terminal 210 is an electric contact point for the digital camera 100 to perform communication with the lens unit 200. An eyepiece part 216 is a look-through type eyepiece finder. The user can visually recognize an image displayed on an electronic viewfinder (EVF) which is the in-finder display unit 229 through the eyepiece part 216, and can confirm the focus and composition of the captured object image through the lens unit 200 that will be described later in FIG. 2.

An eye approach detection unit 217 is arranged near the eyepiece part 216, and can detect approach of any object to the eyepiece part 216. As the eye approach detection unit 217, for example, an infrared proximity sensor is used.

Next, with reference to FIG. 2, the internal configuration of the digital camera 100 and the lens unit 200 of the present embodiment will be described. In FIG. 2, components that are the same as those in FIGS. 1A and 1B are denoted by the same reference numerals.

In FIG. 2, the lens unit 200 is equipped with a shooting lens 207, and is detachable from the digital camera 100. The shooting lens 207 is usually constituted by a plurality of lenses, but is simplified here and is shown by one lens. A communication terminal 206 is an electric contact point for the lens unit 200 to perform communication with the digital camera 100. The communication terminal 210 is an electric contact point for the digital camera 100 to perform communication with the lens unit 200. The lens unit 200 performs communication with the system control unit 201 via the communication terminal 206, and a built-in lens control unit 204 controls a diaphragm driving circuit 202 so as to drive a diaphragm aperture 205, and controls an AF driving circuit 203 so as to displace the position of the shooting lens 207, thereby bringing the object image in focus.

A focal plane shutter 221 can freely control the exposure time of the image capturing unit 222 in accordance with an instruction from the system control unit 201. The image capturing unit 222 is an image sensor constituted by an imaging element such as a CCD or a CMOS for converting the object image into electrical signals. An A/D converter 223 converts an analog signal output from the image capturing unit 222 into a digital signal.

An image processing unit 224 performs resizing processing, such as predetermined pixel interpolation and reduction, and color conversion processing, with respect to data from the A/D converter 223 or data from a memory control unit 215. Further, the image processing unit 224 performs predetermined calculation processing using the captured image data, and the system control unit 201 performs exposure control and focus control based on the calculation results. Thus, AF (Automatic Focus) processing, AE (Automatic Exposure) processing, and EF (flash pre-emission) processing of TTL (Through the Lens) type are performed. Furthermore, the image processing unit 224 performs predetermined calculation processing using the captured image data, and AWB (Automatic White Balance) processing of TTL type is performed on the basis of the calculation results.

A memory control unit 215 controls to exchange data between the A/D converter 223, the image processing unit 224, and the memory 232. Digital data output from the A/D converter 223 is directly written into the memory 232 via both the image processing unit 224 and the memory control unit 215 or via the memory control unit 215. The memory 232 stores image data obtained from the image capturing unit 222 and the A/D converter 223, and display data for displaying the image on the backside display unit 101 or the in-finder display unit 229. The memory 232 has a storage capacity that is sufficient for storing a predetermined number of still images as well as moving images and audio of a predetermined time period. The memory 232 also functions as a memory for image display (video memory).

A D/A converter 219 converts the display data for the image stored in the memory 232 into an analog signal and supplies the backside display unit 101 or the in-finder display unit 229 with the analog signal. The display data for the image that was written into the memory 232 is displayed by the backside display unit 101 or the in-finder display unit 229 via the D/A converter 219. The backside display unit 101 and the in-finder display unit 229 display on the display device in accordance with the analog signal from the D/A converter 219. In this manner, the digital signals stored in the memory 232 are converted into analog signals, and the analog signals are successively transmitted to the backside display unit 101 or the in-finder display unit 229 so as to be displayed thereon, making it possible to function as an electronic view finder (EVF) and to perform live view (LV) display (through-the lens image display).

Various setting values of the camera such as a shutter speed and a diaphragm aperture are displayed on the out-of-finder display unit 243 via an out-of-finder display unit driving circuit 244.

A nonvolatile memory 256 is an electrically erasable/recordable memory, and for example, a flash ROM or the like is used. In the nonvolatile memory 256, constants and programs, for example, for operating the system control unit 201 are stored. In this context, "programs" may refer to programs for executing flowcharts that will be described later.

The system control unit 201 is an arithmetic processing device comprising at least one processor or circuit, overall controlling the entire digital camera 100. The system control unit 201 realizes, by executing the programs stored in the nonvolatile memory 256, the procedures of the flowchart that will be described later. As the system memory 252, for example, RAM is used, and the system memory 252 is used also as a work memory where constants and variables for operating the system control unit 201 and the programs read out from the nonvolatile memory 256 are expanded. The system control unit 201 controls the memory 232, the D/A converter 219, the backside display unit 101, the in-finder display unit 229, and/or the like, so as to perform display control. A system timer 253 is a time measurement unit for measuring time periods for various types of controls and the time of an inner clock.

The mode selection switch 103, a first shutter switch 211, a second shutter switch 212, and the operation units 270 are operation devices for inputting various types of operating instructions to the system control unit 201. The mode selection switch 103 switches the operation mode of the system control unit 201 to any of a still image shooting mode, a moving image recording mode, and a reproduction mode. The still image shooting mode includes an automatic shooting mode, an automatic scene determination mode, a manual mode, aperture-priority mode (Av mode), shutter-priority AE mode (Tv mode), and program AE mode (P mode), for example. The still image shooting mode also includes various scene modes each for which scene-specific shooting setting is made, custom mode, and/or the like.

The user may directly switch to any of these shooting modes by operating the mode selection switch 103, or may switch to any of the shooting modes using another operation member after once being switched to a list screen of the operation modes with the mode selection switch 103 and selecting any of the plurality of shooting modes displayed in a list. Similarly, also the moving image recording mode and the reproduction mode may include a plurality of modes.

While the shutter-release button 102 provided on the digital camera 100 is being operated, that is, pressed halfway (the shooting preparation instruction), the first shutter switch 211 is turned on and generates a first shutter switch signal SW1. Upon receiving the first shutter switch signal SW1, the system control unit 201 starts shooting preparation operations such as AF (auto focus) processing, AE (auto exposure) processing, AWB (auto white balance) processing, and EF (flash pre-emission) processing.

When the operation of the shutter-release button 102 is completed, that is, the shutter-release button 102 is pressed fully (the shooting instruction), the second shutter switch 212 is turned on and generates a second shutter switch signal SW2. Upon receiving the second shutter switch signal SW2, the system control unit 201 starts a series of shooting processing from reading out the signal from the image capturing unit 222 to writing of the captured image data as an image file to the recording medium 250.

The operation units 270 comprise operation members such as various switches and buttons for accepting various operations from a user, and notifying the system control unit 201 of the accepted operations, and include at least the following operation members: the shutter-release button 102, the mode selection switch 103, the main electronic dial 105, the power supply switch 106, the sub electronic dial 107, the cross key 108, the SET button 109, the lock button 110, the enlargement/reduction button 111, the delete button 112, the reproduction button 113, the menu button 114, multi-controller 115 and the control ring 271.

A power control unit 280 is constituted by, for example, a battery detection circuit, a DC-DC converter, and a switch circuit for changing over the block to be supplied with power, and detects whether a battery has been inserted or not, the type of the battery, and the residual capacity thereof. Further, the power control unit 280 controls the DC-DC converter in accordance with the detection results and an instruction of the system control unit 201, and supplies a necessary voltage for a necessary length of time to each component including the recording medium 250.

A power supply unit 230 comprises a primary battery such as an alkaline battery or a lithium battery, a secondary battery such as a NiCd battery, a NiMH battery, or a Li-ion battery, or an AC adaptor. A recording medium interface (I/F) 218 is for interfacing with the recording medium 250 such as a memory card or a hard disk drive. The recording medium 250 is a recording medium such as a memory card for recording shot images, and is constituted by a semiconductor memory, a magnetic disk, or the like.

A communication unit 254 communicably connects an external device by a wireless antenna or a cable, and transmits and receives a video signal, an audio signal, and/or the like. The communication unit 254 can also connect to a wireless LAN (Local Area Network) and the Internet. The communication unit 254 can transmit image data (including a live view image) captured by the image capturing unit 222 and an image file recorded on the recording medium 250 to an external device, and can receive image data or other various information from the external device. Note that the communication unit 254 is not limited to a wireless LAN, but may use a wireless communication module such as an infrared communication, Bluetooth®, Bluetooth® Low Energy or Wireless USB, or a wired connection device such as a USB cable, HDMI®, IEEE 1394, or the like.

An attitude detection unit 255 detects the attitude (orientation) of the digital camera 100 with respect to the gravity direction. Based on the attitude detected by the attitude detection unit 255, it is possible to discriminate whether an image captured by the image capturing unit 222 has been shot by setting the digital camera 100 in the landscape or portrait direction. The system control unit 201 can add information about the orientation information corresponding to the attitude detected by the attitude detection unit 255 to the image file, and rotate and record the captured image. An acceleration sensor, gyro sensor or the like may be used as the attitude detection unit 255. The attitude detection unit 255 can also detect the movement (pan, tilt, lift, rest, etc.) of the digital camera 100 by using the acceleration sensor or the gyro sensor.

Included among the operation units 270 is also the touch panel 270a that is capable of detecting a touch operation on the backside display unit 101. The touch panel 270a and the backside display unit 101 can be constructed as a single integrated unit. For example, the touch panel 270a is constructed in such a manner that the transmittance of light will not interfere with the display presented by the backside display unit 101, and it is attached to the uppermost layer of the display face of the backside display unit 101. In addition, input coordinates on the touch panel 270a and display coordinates on the backside display unit 101 are correlated. As a result, a GUI can be constructed so as to make it possible for the user to directly manipulate the screen displayed on the backside display unit 101. The system control unit 201 is capable of detecting the following touch operations and/or conditions performed by contacting the touch panel 270a.

Newly touching of the touch panel 270a by a finger or pen which has not been in contact with the touch panel 270a, that is, a start of the touch (referred to as "touch-down" below).

A state in which the touch panel 270a is in contact with a finger or pen (referred to as "touch-on" below).

Movement of a finger or pen while in contact with the touch panel 270a (referred to as "touch-move" below).

Releasing a finger or pen that has been in contact with the touch panel 270a, that is, an end of the touch (referred to as "touch-up" below).

A state in which the touch panel 270a is not being touched at all (referred to as "touch-off" below).

When touch-down is detected, the touch-on state is also detected at the same time.

These operations/conditions and position coordinates at which the touch panel 270a is being touched by the finger or pen are communicated to the system control unit 201 through an internal bus and, based upon the information thus communicated, the system control unit 201 determines what kind of operation (touch operation) was performed on the touch panel 270a.

As for "touch-move", the determination can be made also for every vertical component and horizontal component with regard to the direction of movement of the finger or pen, which is moved on the touch panel 270a, based upon a change in the coordinate position. Further, the system control unit 201 can determine that a slide operation (drag) has been performed if it detects a touch-move over a predetermined distance. An operation in which a finger is touched against the touch panel, swiftly moved a certain distance, and then lifted away will be referred to as a "flick". In other words, a flick is an operation in which a finger is swiftly flicked across the touch panel 270a. If a touch-move with a predetermined distance or higher and a predetermined speed or higher is detected, and then a touch-up is detected, it can be determined that a flick has been performed (it can be determined that a flick was performed in succession to a drag). Furthermore, a touch operation in which the touch panel is touched at multiple locations (for example, two points) at the same time, and then the touch positions are moved closer to each other will be referred to as a "pinch-in", and a touch operation in which the touch positions are moved away from each other will be referred to as a "pinch-out". Pinch-out and pinch-in operations will be collectively referred to as "pinch operations" (or simply "pinching").

The touch panel 270a may employ a method that relies upon any of the following: resistive film, electrostatic capacitance, surface acoustic waves, infrared radiation, electromagnetic induction, image recognition and optical sensing. There are methods in which a touch is detected based on contact with the touch panel, as well as methods in which a touch is detected based on approach of a finger or a pen to the touch panel, and any method may be employed.

The digital camera 100 of the present embodiment has a touch and drag function that allows the user to move the AF frame (AF, that is, an indicator indicating a focus adjustment position for performing focus adjustment) or change parameters while looking through the finder. For example, in the touch and drag AF, by performing the tap or the touch-move on the touch panel 270a, it is possible to move the AF frame displayed on the in-finder display unit 229 to a desired position (a position of an object of a tracking target or an object of a focusing target). When the touch-move operation is performed in an eye approaching state, the user can set the method of designating the position indicator according to the touch-move operation to either an absolute position designation or a relative position designation. For example, if the position indicator is an AF frame, in the case of the absolute position designation, if there is the touch-down on the touch panel 270a, the AF position associated with the touched-down position (the position at which coordinates are input) is set regardless of the AF position (current AF position) set before the touch-down. That is, the position coordinates at which the touch operation is performed and the position coordinates of the backside display unit 101 are associated with each other. On the other hand, in the case of the relative position designation, the position coordinates in which the touch operation is performed and the position coordinates of the backside display unit 101 are not associated with each other. In the relative position designation, the AF position does not move at the time of touch-down. If there is the touch-move after the touch-down is performed, the AF position is moved in a movement direction of the touch-move from the AF position (current AF position) set before the touch is performed by only a distance corresponding to the movement amount of the touch-move, regardless of the touch-down position on the touch panel 270a.

The eye approach detection unit 217 detects whether an eye (an object) has approached or contacted (eye approaching) or has moved away from (eye detached) the eyepiece part 216 (approach detection). The system control unit 201 switches the backside display unit 101 and the in-finder display unit 229 between displaying (a display state) and not displaying (a non-display state) in accordance with the state detected by the eye approach detection unit 217. The system control unit 201 sets a display destination as the backside display unit 101 and sets the in-finder display unit 229 to be not displaying during non-eye approach detection at least in a case where the shooting mode and the switching of the display destination are automatic. Further, the system control unit 201 sets the display destination as the in-finder display unit 229 and sets the backside display unit 101 to be not displaying during eye approach detection.

If an object has approached, infrared light irradiated from a light emitting unit (not illustrated) of the eye approach detection unit 217 is reflected and is made to be incident on a light receiving unit (not illustrated) of the infrared proximity sensor. In accordance with an incident light amount of the infrared light received by the infrared proximity sensor, it is possible to detect an approach of some kind of physical object to the eyepiece part 216, and discriminate to what level of distance the object has gotten close to the eyepiece part 216 (an eye approaching distance). Upon detecting an approach of an object to the eyepiece part 216, the system control unit 201 can cause display of the in-finder display unit 229 to start. With this, it is possible for the in-finder display unit 229 to display without delay as much as possible when a user looks through the eyepiece part 216.

In addition, upon detecting that an object has approached within a predetermined distance with respect to the eyepiece part 216 from a non-eye approaching state (no approach state), the eye approach detection unit 217 determines that eye approaching is detected and transmits an eye approach detection notification to the system control unit 201. In addition, if an object for which an approach was detected is apart by the predetermined distance or more from an eye approaching state (approach state), the eye approach detection unit 217 determines that eye separation is detected, and an eye separation detection notification is transmitted to the system control unit 201. A threshold for detecting eye approaching and a threshold for detecting eye separation may be made different such as by providing hysteresis for example. In addition, it is assumed that, after eye approaching is detected, there is an eye approaching state until eye separation is detected. In addition, it is assumed that, after eye separation is detected, there is a non-eye approaching state until eye approaching is detected. With this, the system control unit 201 performs display control of the backside display unit 101 and the in-finder display unit 229 in response to an eye approaching state or an eye separation state detected by the eye approach detection unit 217.

Note that the eye approach detection unit 217 is not limited to an infrared proximity sensor, and another sensor may be used if it can detect an approach of an object or an eye to be deemed as eye approaching. In the present embodiment, the light projecting portion and the light receiving portion of the approach detection unit 217 are separate devices from an infrared light-emission element 266 and a sight line detection sensor 264 of a sight line detection unit 260 that will be described later, but the light projecting portion of the eye approach detection unit 217 may also serve as the infrared light-emission element 266 and the light receiving portion as the sight line detection sensor 264.

The sight-line detection unit 260 includes a dichroic mirror 262, an image forming lens 263, a sight line detection sensor 264, a sight line detection circuit 265, and an infrared light-emission element 266 which follow, and detects whether or not there is a sight line of a user and also detects movement or a position of the sight line.

The digital camera 100 of the present embodiment detects the sight line by the sight line detection unit 260 with a method called corneal reflection method. The corneal reflection method is a method of detecting a position and an orientation of the sight line from a positional relationship between a reflected light in which the infrared light emitted from the infrared light-emission element 266 is reflected by an eye ball (eye) 261 (especially the cornea) and the pupil of the eye ball (eye) 261. In addition, there are various methods for detecting the position and orientation of the sight line, such as a method called scleral reflection method, which utilizes the fact that the light reflectance in the iris is different from that in the white of the eye. Note that other sight line detection methods may be used as long as they can detect the position and orientation of the sight line.

The infrared light-emission element 266 is a diode for emitting an infrared light for detecting a sight-line position of a user in a finder screen, and irradiates the infrared light onto an eye ball (eye) 261 of a user toward the vicinity of the center of the eyepiece part 216. The infrared light irradiated from the infrared light-emission element 266 is reflected by the eye ball (eye) 261, and the reflected infrared light reaches the dichroic mirror 262. The dichroic mirror 262 has a function for reflecting only infrared light and allowing visible light to pass, and the reflected infrared light whose light path has been changed forms an image on an image capture plane of the sight line detection sensor 264 via the image forming lens 263.

The image forming lens 263 is an optical member that configures a sight line detection optical system. The sight line detection sensor 264 includes an image sensor that uses a CCD, CMOS, or the like. The sight line detection sensor 264 photo-electrically converts incident reflected infrared light into an electric signal, and outputs the electric signal to the sight line detection circuit 265. Based on the output signal from the sight line detection sensor 264, the sight line detection circuit 265 detects a sight-line position of a user from a position of a pupil or movement of the eye ball (eye) 261 of the user, and outputs detected information to the system control unit 201. The sight line detection sensor 264 can detect a pupil of an eye of a person, and thus, even if another object approaches or touches the eyepiece part 216, the sight line detection sensor 264 does not detect that a sight line of a person has been inputted. By this, the eyepiece part 216 has a function as a sight line operation unit, but the sight line detection unit may be another configuration.

The system control unit 201 is capable of determining the following states and operations with respect to the eyepiece part 216.

The sight line is not input to the eyepiece part 216/the sight line is newly input to the eyepiece part 216 (start of sight line input).

Being in the state of ongoing sight line input to the eyepiece part 216. Being in the state where a region of the eyepiece part 216 is being gazed at.

The sight line input to the eyepiece part 216 has been removed (end of sight line input).

Being in the state where no sight line is being input to the eyepiece part 216. These operations/states and an input position of a sight line for the eyepiece part 216 are notified to the system control unit 201, and the system control unit 201 can determine what kind of operation (sight line operation) has been performed for the eyepiece part 216 based on the notified information.

Note that a gaze refers to a case where the sight line position of the user does not exceed a predetermined movement amount within a predetermined time. That is, the system control unit 201 determines, based on the detection information received from the sight line detection circuit 265, when the time period in which the sight line of the user is fixed in a certain region exceeds a predetermined threshold, that the user is gazing at the region. Therefore, it can be said that the region is a gaze position (gaze area) which is a position where the gaze is performed. Note that "the sight line is fixed in the certain region" means, for example, that the average position of the movement of the sight line is within the region until a predetermined time period elapses, and the variation (variance) is less than a predetermined value.

<Touch Detection Method>

Next, with reference to FIGS. 3 to 7, the touch detection method of the first embodiment will be described.

In the present embodiment, a threshold of a touch area (square measure) for determining a touch operation on the touch panel 270a as a touch operation unintended by the user is set. The threshold of the touch area is set to a different value depending on whether or not the eye approaching state in which the user is looking through the finder is. In the present embodiment, the threshold is set to one of the threshold 1 and the threshold 2 having a value larger than the threshold 1, but three or more thresholds may be provided. The set threshold is stored in the nonvolatile memory 256, and is read by the system control unit 201 at the time of the eye approach detection by the eye approach detection unit 217.

Next, a detailed configuration of the touch panel 270a of the present embodiment will be described with reference to FIG. 3.

Figure 3:
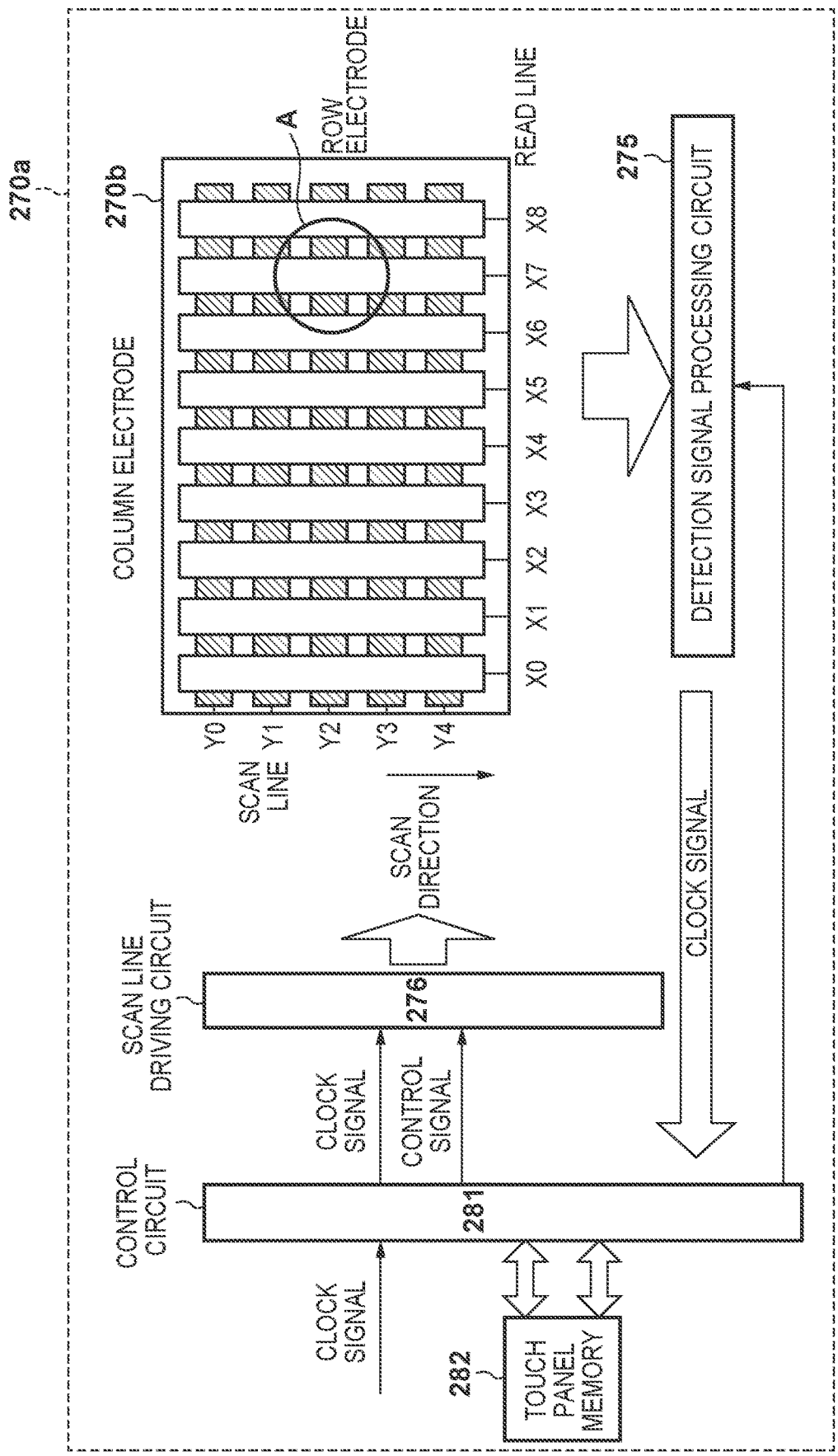
FIG. 3 is a block diagram illustrating a configuration of a touch panel of the present embodiment.

In the touch panel sensor 270b, a plurality of column electrodes (X0 to X8) are arranged in the lateral (horizontal) direction in FIG. 3, a plurality of row electrodes (Y0 to Y4) are arranged in the longitudinal (vertical) direction in FIG. 3, the column electrodes and the row electrodes intersect each other. The intersection point A indicates a sensor intersection point of the column electrode X7 and the row electrode Y2. The row electrodes are connected to a constant current circuit (not shown), the column electrode is fixed to a predetermined potential. When a weak current is made to flow by a constant current circuit (not shown), charges are accumulated in the mutual capacitance generated between the column electrode and the row electrode. A sub-scan in which a plurality of times of accumulation per one sensor intersection point is performed and the accumulated charges are integrated in the integrating circuit. The measurement result of one sensor intersection point (one scan) is converted into a digital signal, and it is possible to determine whether or not the touch detection is performed by measuring the change amount of the obtained signal value as the change amount of the capacitance.

A scan line driving circuit 276 is a circuit for sequentially selecting and driving the scan lines. A weak current is passed through the selected scan line by a constant current circuit. The number of times of sub-scans per scan line can be arbitrarily changed by a command from the system control unit 201 to the control circuit 281. A detection signal processing circuit 275 is a circuit which sequentially selects the read line and reads the detection signal. The scan line driving circuit 276 and the detection signal processing circuit 275 are driven by clock signal supplied by the control circuit 281.

The control circuit 281 detects whether or not the detection signal value of each electrode output by the detection signal processing circuit 275 exceeds the touch determination threshold, and if it exceeds, sets the touch detection flag to sequentially transfer the data to the touch panel memory 282. When scanning of one frame is completed, grouping of the touch detection regions and calculation of the center of gravity of the touch position are performed on the detection data of one frame stored in the touch panel memory 282, and the number of touch detections, the touch detection coordinates, and the touch are calculated.

In the present embodiment, the touch area is obtained by the total number of sensor intersection points (of the sensors included in the touch panel) at which a change amount of a capacitance being not less than a threshold has been measured. The method of determining the touch area is not limited to the method of determining by the number of sensor intersection points touched as described above, and the size of the touched area may be detected.

Next, with reference to FIGS. 4A1, 4A2, 4B1 and 4B2, a method of calculating the touch area will be described.

FIGS. 4A1, 4A2, 4B1 and 4B2 are diagrams illustrating a calculation method of a touch area by touch operation on the touch panel 270a, and FIGS. 4A1 and 4A2 are diagrams illustrating cases in which the touch-on is performed with one finger in a normal state, and FIGS. 4B1 and 4B2 are diagrams illustrating cases in which the touch-on is performed with the finger lying down.

FIGS. 4A1 and 4B1 illustrate a condition in which the finger Y (conductive material) of the user touches the touch panel 270a when viewed from the side (the position of the sensor intersection point where the finger is touched) and an amount of change in capacitance at the respective coordinates. The amount of change in capacitance is displayed by aligning the amount of change in capacitance detected at each sensor intersection point at Y=α in FIGS. 4A2 and 4B2 with the X coordinates (a1 to a10 in FIG. 4A2 and b1 to b10 in FIG. 4B2) of each sensor intersection point. The amount of change in the capacitance is the amount of change in capacitance at each sensor intersection point generated between the finger Y and the touch panel 270a, which is the sum of the amount of change in the capacitance detected within a predetermined period of time. The touch area is obtained by the number of sensor intersection points where the amount of change in capacitance being larger than the touch area threshold is detected. It is assumed that the sensor intersection point where the amount of change in capacitance being larger than a touch determination threshold that is larger than the touch area threshold is detected, is determined to have had a touch operation performed on the sensor intersection point. In this manner, the coordinates at which the touch operation is performed and the type of the touch operation are determined. The touch area has a threshold smaller than that of the touch-down and makes it easier to detect a touch operation or the like with a weaker force. This is to prevent the touch operation from being accepted as a valid operation with a weaker force (a weaker force such as the abdomen of the user who carries the camera hitting) rather than the case where the user intentionally performs the touch operation with a strong force. Thresholds for determining the touch operation unintended by the user and thresholds for determining the touch operation intentionally performed by the user are set.

In FIGS. 4A1 and 4A2, since the change amount of the detected capacitance in the coordinates a1 and a6 to a10 is not less than the touch area threshold for determining whether to include the respective sensor intersection points in the touch area or not include in the touch area. The coordinates a2 and a5 are included in the touch area because the detected change amount of the capacitance is larger than the touch area threshold, but since the change amount is not more than the touch determination threshold for detecting the touch operation to each sensor intersection point, it is assumed that there is no touch operation to each sensor intersection point. Since the detected change amount of the capacitance is larger than the touch area threshold and the touch determination threshold, the coordinates a3 to a4 are included in the sensor intersection point for calculating the touch position, and it is determined that the touch operation to each sensor is performed.

FIGS. 4A2 and 4B2 illustrates the touch panel sensor 270b indicating the sensor intersection points of the touch panel 270a, and each sensor intersection point is replaced by one box. In FIGS. 4A1 and 4B1, the change amount of the capacitance at the sensor intersection point of Y=α is shown. In FIGS. 4A2 and 4B2, however, the change amount of the capacitance detected at Y=α−1 to α+2 is shown. The change amount of the capacitance detected at the sensor intersection point of the boxes shown in black dots indicate the sensor intersection point exceeding the touch determination threshold, and the change amount of the capacitance detected at the sensor intersection point of the boxes shown in diagonal lines indicates the sensor intersection point exceeding the touch area threshold.

In FIG. 4B2, there are four boxes shown in black dots, and the area (the number of sensor intersection points) where the touch operation is determined to have been performed is 4, and the coordinates determined by the center of gravity of the four points are the coordinates of the touch-down point. In addition, there are eight boxes shown in diagonal lines, and together with four boxes shown in black dots, the number of sensor intersection points exceeding the touch area threshold is 12, and the touch area is 12.

In FIG. 4B2, there are eight boxes shown in black dots, and the area (the number of sensor intersection points) determined to have been touched is 8. In addition, there are 17 boxes shown in diagonal lines, and the number of sensor intersection points exceeding the touch area threshold is 25 together with 8 boxes shown in black dots, and the touch area is 25.

For example, when the touch area of the threshold 1 (the number of sensor intersection points) is 16 and the touch area of the threshold 2 is 30, in the case of FIGS. 4A1 and 4A2, the threshold 1 and the threshold 2 are not both exceeded, and the touch operation is determined to be valid. Further, in the case of FIGS. 4B1 and 4B2, since the threshold 1 is exceeded but the threshold 2 is not exceeded, it is determined that the touch operation is invalid when the threshold 1 is set, but it is determined that the touch operation is valid when the threshold 2 is set.

Note that the calculation of the touch area may be performed by the control circuit 281 of the touch panel 270a instead of the system control unit 201. In this case, the system control unit 201 reads the touch area calculated by the control circuit 281 of the touch panel 270a.

Next, with reference to FIGS. 6A1, 6A2, 6B1, 6B2 and 7, the relationship between the eye approaching state and the touch area of the present embodiment will be described.

FIG. 6A1 illustrates the distance between the camera and the face in the eye approaching state. FIG. 6A2 illustrates the touch area in the eye approaching state.

In the eye approaching state, the distance between the camera and the face is short, and the touch area increases because the touch operation is performed while the finger is lying down. FIG. 6B1 illustrates the distance between the camera and the face in the eye separation state. FIG. 6B2 illustrates the touch area in the eye separation state.

Since the distance between the camera and the face is sufficiently large, the touch area becomes small because the touch operation is performed in the state in which the finger is raised. FIG. 7 illustrates examples of the touch areas in the states of FIGS. 6A1-6A2 and FIGS. 6B1-6B2.

The threshold of the touch area to be determined as the unintended touch operation by the user in the present embodiment is set to 10 as the threshold 1 and 30 as the threshold 2. In the cases of FIGS. 6A1 and 6A2, the touch area is 25, and in the case of FIGS. 6B1 and 6B2, the touch area is 8. That is, in the case of FIGS. 6A1 and 6A2, since the threshold 1 is exceeded but the threshold 2 is not exceeded, it is determined that the touch operation is invalid when the threshold 1 is set, but it is determined that the touch operation is valid when the threshold 2 is set. In the cases of FIGS. 6B1 and 6B2, since both the threshold 1 and the threshold 2 are not exceeded, it is determined that the touch operation is valid. Since the touch operation in the eye approaching state is performed in a state in which the finger is laid down more than the touch operation in the non-eye approaching state, the touch area is easily widened and the threshold is easily exceeded. Therefore, when the threshold is small, the touch operation in the eye approaching state is easily determined as an invalid touch operation, and when the threshold is large, the touch operation is easily determined as a valid touch operation. However, in any case, if the threshold is increased, all of the touch operations that do not exceed the threshold are determined to be valid, and there is a possibility that processing by the touch operation unintended by the user is executed. On the other hand, when the threshold is decreased, it is difficult to determine that the touch operation in the eye approaching state is valid.

Next, with reference to FIGS. 5A and 5B, the touch detection processing in the shooting mode of the present embodiment will be described.

Figure 5A:
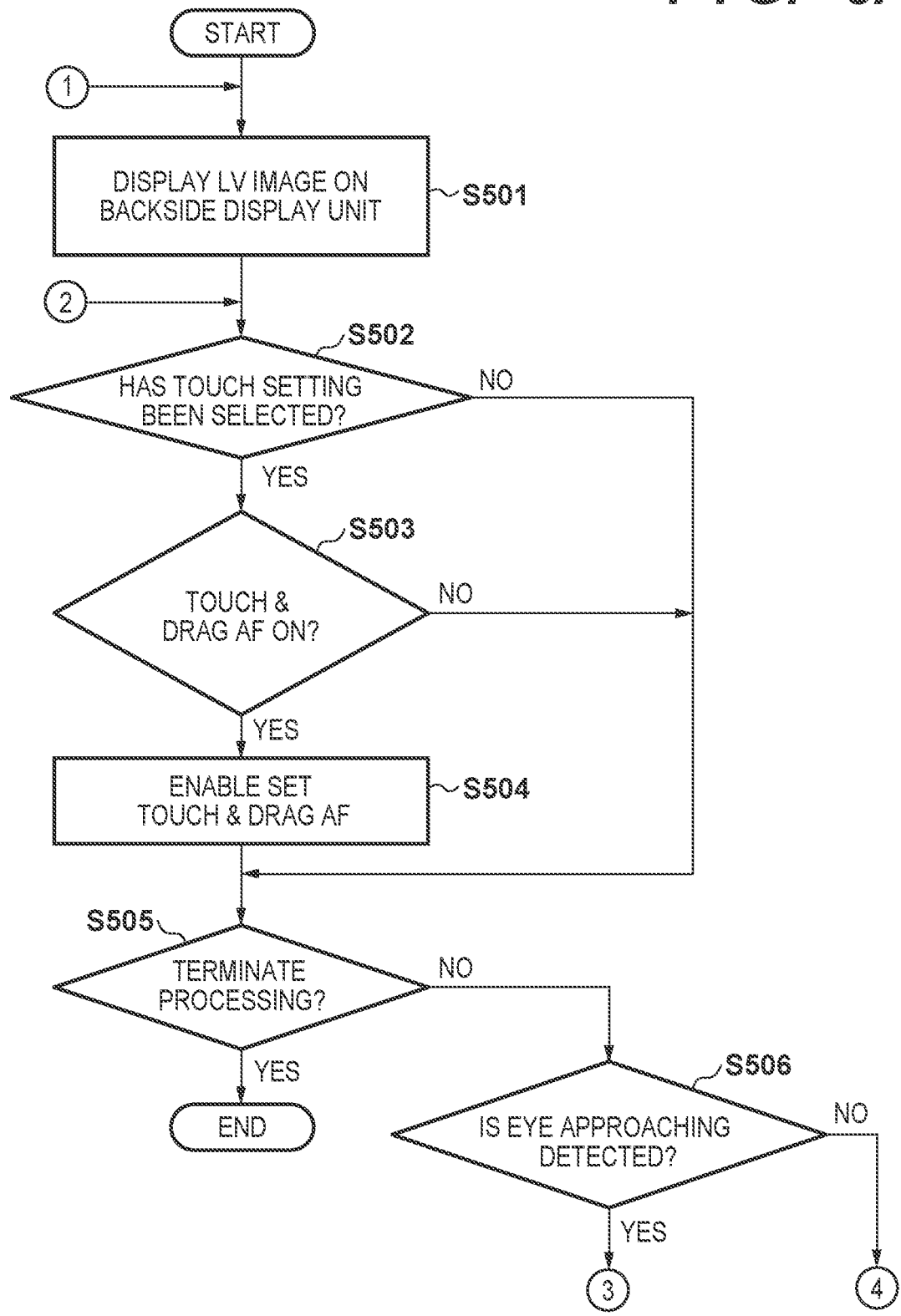
FIGS. 5A and 5B are flowcharts illustrating touch detection processing of the first embodiment.
Figure 5B:
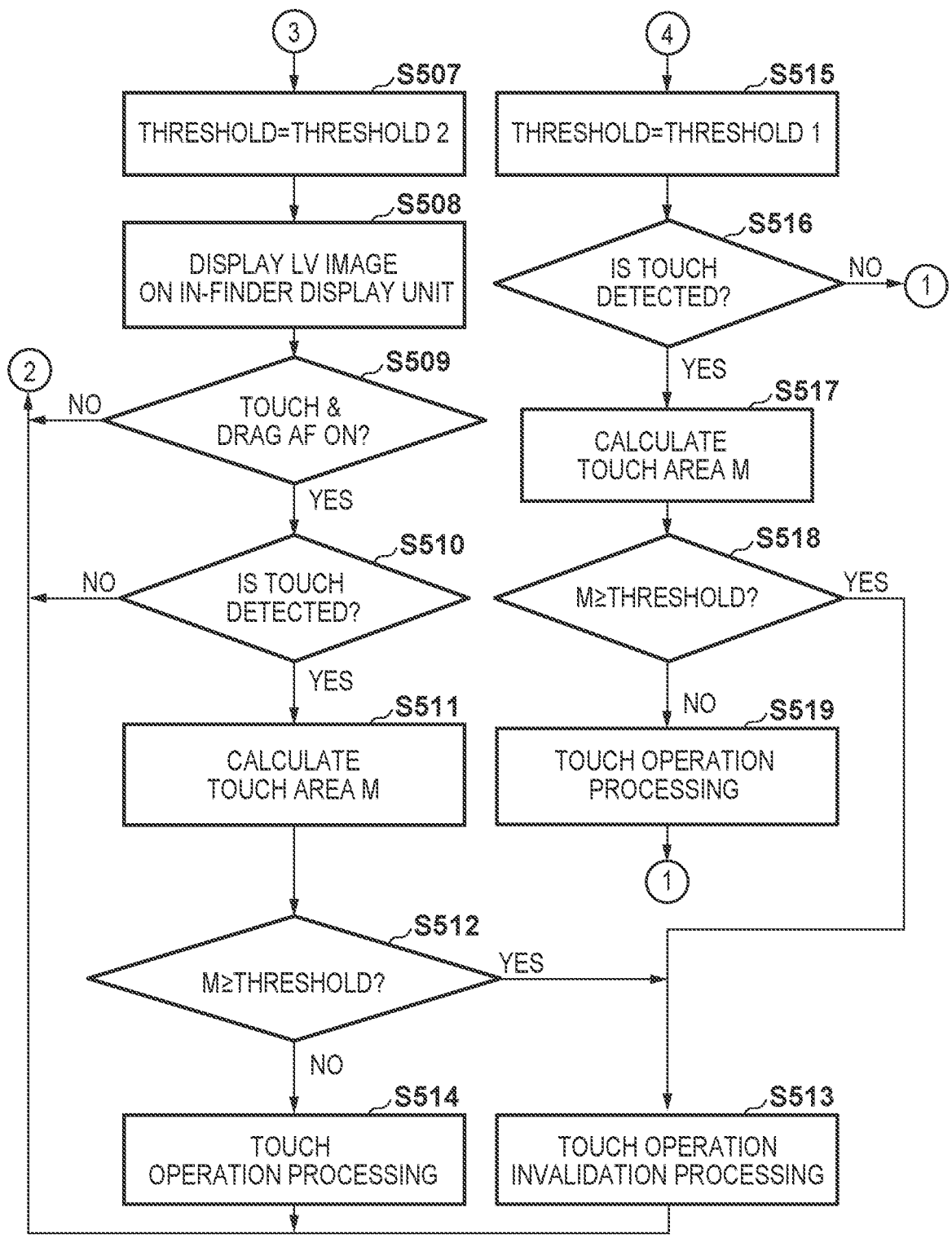

Note that the processing of FIGS. 5A and 5B is realized by expanding the programs stored in the nonvolatile memory 256 into the system memory 252, executing the programs by the system control unit 201, and controlling the respective components. Further, the processing of FIGS. 5A and 5B is started when the power of the digital camera 100 is turned on and the shooting mode is selected. This also applies to FIGS. 8A and 8B described later.

In step S501, the system control unit 201 displays a live view image (LV image, through-the lens image) on the backside display unit 101.

In step S502, the system control unit 201 determines whether or not a touch setting for performing a setting related to a touch operation has been selected on the menu screen. The menu screen is displayed by pressing the menu button 114, and when the touch operation setting is selected on the menu screen, the touch setting can be selected. For the touch setting, it is possible to select whether to enable AF setting change (touch & drag AF) by the touch operation in the eye approaching state, to set the position designation method to the absolute position designation or the relative position designation, or to select where to set the touch effective area. The touch effective area can be selected from all, right, left, upper right, upper left, lower right, and lower left (effective area setting).

In step S503, the system control unit 201 determines whether or not the AF setting change by the touch operation in the eye approaching state is enabled in the touch setting. If it is determined that the AF setting change (touch & drag AF) by the touch manipulation in the eye approaching state is enabled (on), the processing proceeds to step S504, otherwise, the processing proceeds to step S505.

In step S504, the system control unit 201 enables (turns on) the AF setting change (touch & drag AF) by the touch operation in the eye approaching state. When the photographer looks through the eyepiece part 216, the backside display unit 101 is turned off, and while the live view image is displayed on the in-finder display unit 229, if the AF setting change by the touch operation in the eye approaching state is enabled, the AF position can be set by the touch operation on the backside display unit 101 (the touch panel 270a). Therefore, when the AF setting change by the touch operation in the eye approaching state is enabled, the user can set the AF position with good operability while looking through the eyepiece part 216 even when the backside display unit 101 is the non-display state.

In step S505, the system control unit 201 determines whether or not the shooting mode is to be terminated. The shooting mode is terminated by switching to the reproduction mode, turning off the power of the digital camera 100, etc. If it is determined that the shooting mode is to be terminated, the processing is ended, otherwise, the processing proceeds to step S506.

In step S506, the system control unit 201 determines whether or not the eye approach detection unit 217 of the eyepiece part 216 has detected the approaching of the object (the eye approaching of the user). If it is determined that the eye approach detection unit 217 has detected the approaching of the object, the processing proceeds to step S507, and if not, the processing proceeds to step S515. When it is determined as NO in step S506, the display destination is switched to the backside display unit 101 when the live view image is displayed on the in-finder display unit 229 (displayed in step S508 of one cycle or more earlier). The AF setting change by the touch operation in the eye approaching state is enabled when the eye approach detection unit 217 detects that the user is looking through the eyepiece finder and the display destination is switched from the backside display unit 101 to the in-finder display unit 229.

In step S507, the system control unit 201 sets the threshold of the touch area to be determined as the touch operation unintended by the user to the threshold 2 (>the threshold 1).

In step S508, the system control unit 201 displays the live view image on the in-finder display unit 229. In this case, the live view image of the backside display unit 101 is not displayed together with the display of the live view image on the in-finder display unit 229, but the touch operation can be accepted at least when the AF setting change by the touch operation in the eye approaching state is enabled.

In step S509, the system control unit 201 determines whether or not the AF setting change by the touch operation in the eye approaching state set in step S503 is enabled. If it is determined that the AF setting change by the touch operation in the eye approaching state is enabled, the processing proceeds to step S510, otherwise, the processing returns to step S502.

In step S510, the system control unit 201 determines whether or not the touch panel 270a has been touched. If it is determined that the touch operation has been performed, the processing proceeds to step S511, otherwise, the processing returns to step S502.

In step S511, the system control unit 201 calculates the touch area M. The touch area M is calculated by the number of sensor intersection points at which the change amount of the capacitance being not less than the touch area threshold is detected.

In step S512, the system control unit 201 determines whether or not the touch area M calculated in step S511 is not less than the threshold to be determined as the touch operation unintended by the user. When the system control unit 201 determines that the touch area M is not less than the threshold, the processing proceeds to step S513, and when the system control unit 201 determines that the touch area M is less than the threshold, the processing proceeds to step S514. In this case, the threshold is the threshold 2. That is, in step S512, it is determined whether or not the number of sensor intersection points exceeding the touch area threshold is more than 30 which is the value of the threshold 2, and when the touch area is more than 30, the processing proceeds to step S513, and when the touch area is 30 or less, the processing proceeds to step S514.

In step S513, the system control unit 201 executes processing of invalidating the touch operation detected in step S510, and returns to step S502. That is, in step S513, since the touch area exceeds the threshold even if the touch operation is detected, the system control unit 201 determines that the touch operation is the touch operation unintended by the user. The system control unit 201 does not notify the command for executing the function or notifies that the touch operation is the touch operation unintended by the user so that the processing is not executed by the touch operation. As long as the touch is the touch-on, the command corresponding to the touch operation is not notified. That is, even when the touch-up caused by releasing the touch or the drag or the flick caused by the touch-move of the touch is detected, the function corresponding to the touch operation is not executed.

In step S514, the system control unit 201 executes touch pad operation processing by the touch detected in step S510 and the processing returns to step S502.

In step S515, the system control unit 201 switches the display destination to the backside display unit 101, and sets the threshold of the touch area to be determined as the touch operation unintended by the user to the threshold 1 (<the threshold 2).

In step S516, the system control unit 201 determines whether or not the touch panel 270a has been touched. If it is determined that the touch operation has been performed, the processing proceeds to step S517, otherwise, the processing returns to step S501.

In step S517, the system control unit 201 calculates the touch area M.

In step S518, the system control unit 201 determines whether or not the touch area M calculated in step S517 is not less than the threshold to be determined as the touch operation unintended by the user. When the system control unit 201 determines that the touch area M calculated in step S517 is not less than the threshold, the processing proceeds to step S513, and when the system control unit 201 determines that the touch area M calculated in step S517 is less than the threshold, the processing proceeds to step S519. The threshold in this case is the threshold 1. That is, in step S518, it is determined whether or not the number of sensor intersection points exceeding the touch area threshold is more than 10 which is the value of the threshold 1, and when the touch area is more than 10, the processing proceeds to step S513, and when the touch area is 10 or less, the processing proceeds to step S519.

In step S519, the system control unit 201 executes touch operation processing by the touch operation detected in step S516 and the processing returns to step S501.

Note that during the eye approaching, the threshold of the touch area may not be set, and control may be performed such that the touch operation is not invalidated. Further, the setting threshold is not limited to the above-described example, it may be arbitrarily set by the user.

According to the present embodiment, by changing the threshold of the touch area to be determined as the touch operation unintended by the user in accordance with whether or not it is the eye approaching state, it is possible to reduce the possibility of executing the processing by the touch operation unintended by the user while suppressing the deterioration of the operability of the camera.

Second Embodiment

Next, a second embodiment will be described.

In the second embodiment, the threshold of the touch area to be determined as the touch operation unintended by the user is changed according to the distance (eye approaching distance) to the finder detected by the eye approach detection unit 217.

Hereinafter, the differences from the first embodiment will be mainly described. The apparatus configuration is the same as that of the first embodiment.

First, with reference to FIGS. 9A1, 9B1, 9C1, 9A2, 9B2, 9C2, 10 and 11, the relationship of the touch area according to the eye approaching distances of the present embodiment will be described.

FIG. 9A1 illustrates the eye approaching distance from the camera to the face in the state in which the eye fully contacts the eyepiece part 216. FIG. 9A2 illustrates the touch area in which the eye fully contacts the eyepiece part 216. Since the eye fully contacts the eyepiece part 216, the eye approaching distance is very short, and the touch area becomes large because the touch operation is performed in the state in which the finger is lying down. FIG. 9C1 illustrates the eye approaching distances from the camera to the face in the eye separation state. FIG. 9C2 illustrates the touch area in the eye separation state, and since the eye approaching distance is sufficiently long, the touch operation is performed in the state in which the finger is raised, thereby making the touch area small. FIG. 9B1 illustrates the distance from the camera to the face slightly away from the eyepiece part 216, and this distance relationship is also applied when wearing an eyeglasses. FIG. 9B2 illustrates the touch area slightly away from the eyepiece part 216. Since the eye approaching distance is longer than the eye approaching distance in the state in which the eye fully contacts the eyepiece part 216 in FIGS. 9C1 and 9C2, and there is a space to touch in the state in which the finger is raised a little, the touch area is an area between FIGS. 9A2 and 9C2.

Figure 10:
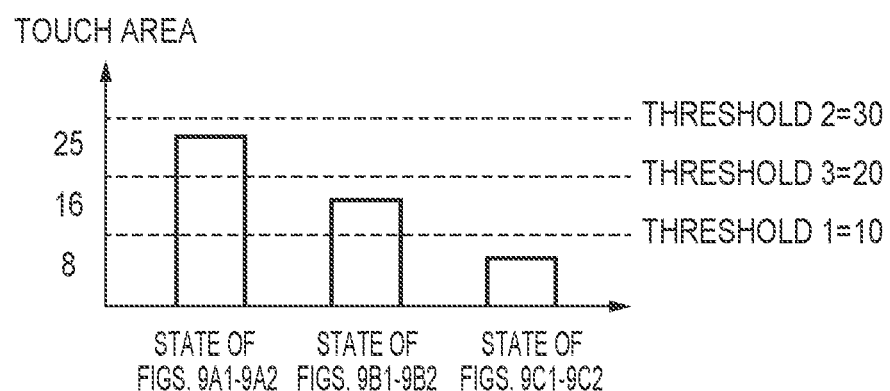
FIG. 10 is a diagram illustrating a relationship between an eye approaching distance, a touch area and a touch determination threshold of the second embodiment.

FIG. 10 illustrates examples of the touch areas in FIGS. 9A1, 9B1, 9C1, 9A2, 9B2 and 9C2. The threshold of the touch area to be determined as the touch operation unintended by the user in the present embodiment is set to 10, 30, and 20, as the threshold 1, the threshold 2, and the threshold 3, respectively. In the cases of FIGS. 9A1 and 9A2, the touch area becomes 25, in the cases of FIGS. 9B1 and 9B2, the touch area becomes 16, and in the cases of FIGS. 9C1 and 9C2, the touch area becomes 8. That is, in the cases of FIGS. 9A1 and 9A2, since the threshold 1 and the threshold 3 are exceeded but the threshold 2 is not exceeded, the touch operation is determined to be invalid when the threshold 1 and the threshold 3 are set, but the touch operation is determined to be valid when the threshold 2 is set. In the cases of FIGS. 9B1 and 9B2, since the threshold 1 is exceeded but the threshold 2 and the threshold 3 are not exceeded, the touch operation is determined to be invalid when the threshold 1 is set, but the touch operation is determined to be valid when the threshold 2 and the threshold 3 are set. In the cases of FIGS. 9C1 and 9C2, all of the threshold 1, the threshold 2, and the threshold 3 are not exceeded, and the touch operation is determined to be valid. Since the shorter the eye approaching distance is, the more the touch operation is performed in the state in which the finger to be touched is laid down, the touch area is likely to be widened, and the threshold is likely to be exceeded when the threshold is set. Therefore, the shorter the eye approaching distance, the smaller the threshold, the easier the touch operation is determined as the invalid touch operation, and on the contrary, the larger the threshold, the easier the touch operation is determined as the valid touch operation. However, in any case, if the threshold is increased, all of the touch operations that do not exceed the threshold are determined to be valid, and there is a possibility that the processing by the touch operation unintended by the user is executed. On the other hand, when the threshold is decreased, the shorter the eye approaching distance, the more difficult the touch operation is determined as the valid touch operation.

Figure 11:
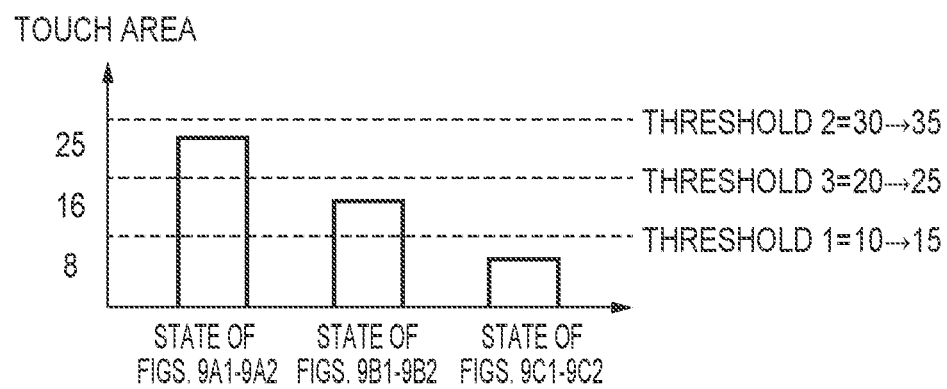
FIG. 11 is a diagram illustrating a relationship between an eye approaching distance, a touch area and a touch determination threshold of the second embodiment.

FIG. 11 illustrates the thresholds of the touch areas to be determined as the touch operation unintended by the user in the eye approaching state of FIGS. 9A1, 9B1, 9C1, 9A2, 9B2 and 9C2 in a mode in which a detection sensitivity of a touch operation that is not directly touched by a finger is increased, for example, a mode in which a touch operation is enabled in a state in which a glove is worn. In such a mode, the values of the threshold 1, the threshold 2, and the threshold 3 are changed to be larger than those in the normal mode. For example, the threshold 1 is changed from 10 to 15, the threshold 2 is changed from 20 to 25, and the threshold 3 is changed from 30 to 35.

Next, with reference to FIGS. 8A and 8B, the touch detection processing in the shooting mode of the present embodiment will be described.

Figure 8A:
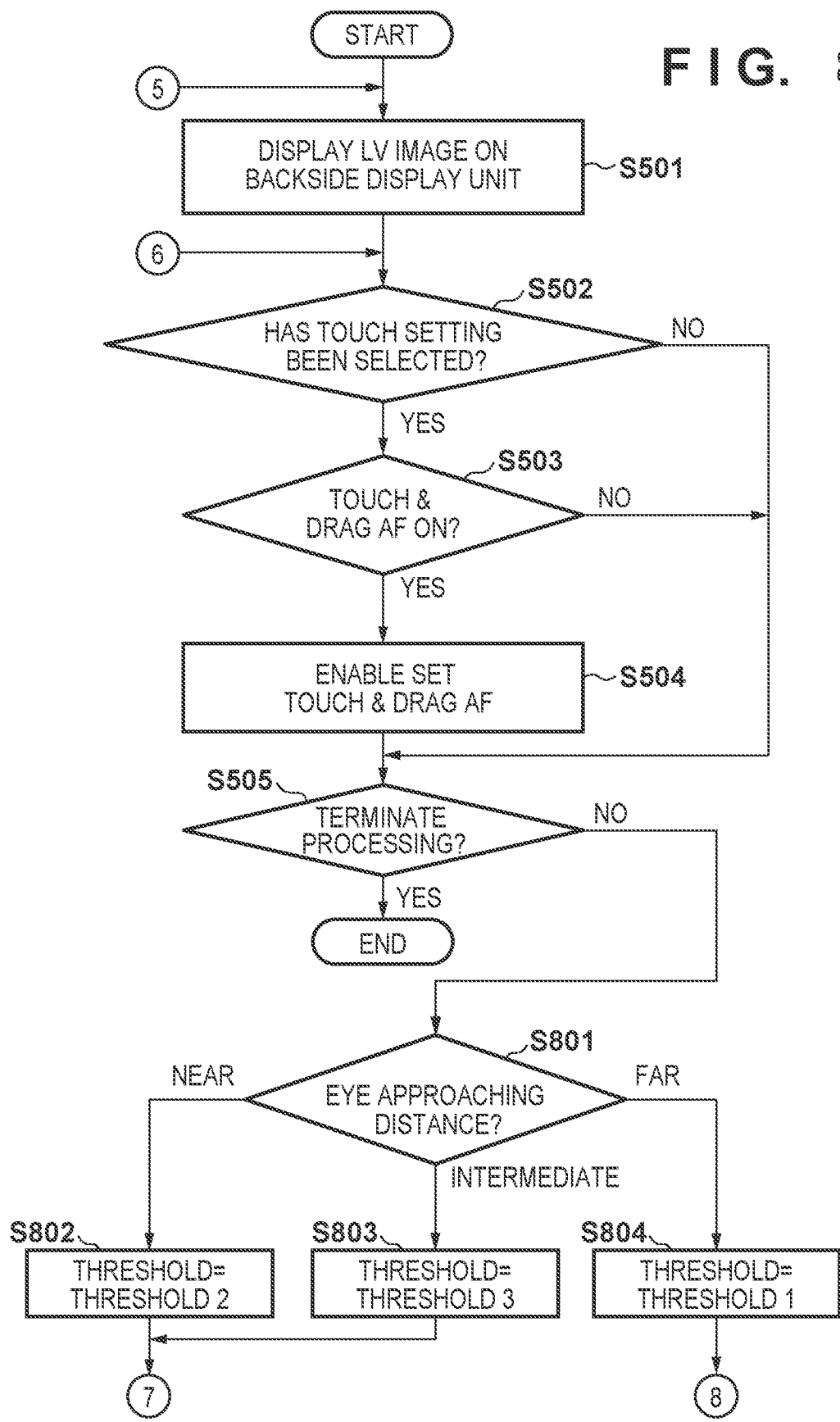
FIGS. 8A and 8B are flowcharts illustrating touch detection processing of a second embodiment.
Figure 8B:
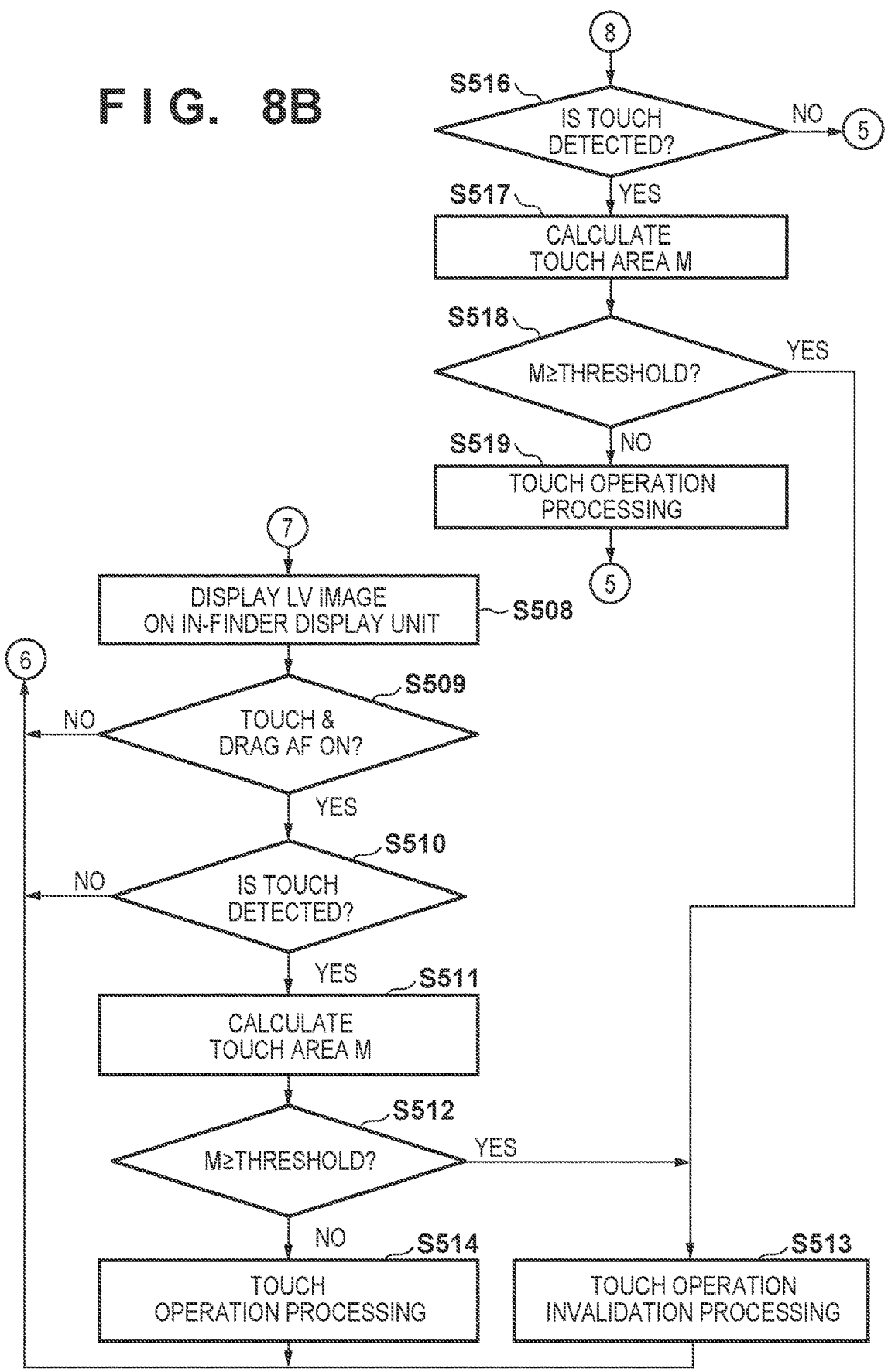

In FIGS. 8A and 8B, the same reference numerals are assigned to the same processing as those in FIGS. 5A and 5B, and the processing of steps S801 to S804 are different from those in FIG. 5A.

If it is determined in step S505 that the shooting mode processing has not been completed, the processing proceeds to step S801.

In step S801, the system control unit 201 determines the eye approaching distance detected by the eye approach detection unit 217. If the eye approaching distance is not more than the second distance, the processing proceeds to step S802. The second distance is, for example, less than 2 cm, which corresponds to FIG. 9A1. If the eye approaching distance is longer than the first distance that is longer than the second distance, the processing proceeds to step S804. The first distance is, for example, 10 cm or more, which corresponds to FIG. 9C1. If the eye approaching distance is a third distance between the first distance and the second distance, the processing proceeds to step S803. The third distance is, for example, 2 cm or more and less than 10 cm, which corresponds to FIGS. 9C1 and 9C2. In the case of steps S802 and S803, when the live view image is displayed on the in-finder display unit 229 (displayed in step S508 of one cycle or more earlier), the display destination is switched to the backside display unit 101. The AF setting change by the touch operation in the eye approaching state is enabled when the eye approach detection unit 217 detects that the user is looking through the finder and switches the display destination from the backside display unit 101 to the in-finder display unit 229.

In step S802, the system control unit 201 sets the threshold of the touch area to be determined as the touch operation unintended by the user to the threshold 2.

In step S803, the system control unit 201 sets the threshold of the touch area to be determined as the touch operation unintended by the user to the threshold 3.

In step S804, the system control unit 201 switches the display destination to the backside display unit 101, and sets the threshold of the touch area to be determined as the touch operation unintended by the user to the threshold 1.

Note that during the eye approaching, the threshold of the touch area may not be set, and control may be performed such that the touch operation is not invalidated. In the present embodiment, the threshold is set to three levels, but the threshold may be set to any number of levels. The threshold and the eye approaching distance are not limited to the above-described examples, and may be arbitrarily set by the user.

According to the present embodiment, by changing the threshold of the touch area to be determined as the touch operation unintended by the user in accordance with the eye approaching distance, it is possible to reduce the possibility of executing the processing by the touch operation unintended by the user while suppressing the deterioration of the operability of the camera.

Note that the foregoing various control described as something that the system control unit 201 performs may be performed by one piece of hardware, and a plurality of pieces of hardware (for example, a plurality of processor and/or circuit) may distribute processing to perform control of the entirety of the apparatus.

In addition, although the present invention was explained in detail based on suitable embodiments, the present invention is not limited to these specific embodiments, and various forms of a scope that does not deviate from the gist of this invention are included in the invention. Furthermore, the above-described embodiment is merely one embodiment of the present invention, and different embodiments can be combined as appropriate.

The foregoing embodiment describes an example of a case where the present invention is applied in a single-lens reflex digital camera. However, the present invention is not limited to this example. The present invention can be applied to an apparatus having a touch & drag function in an eye approaching state. That is, the present invention can be applied in personal computers, PDAs, mobile phone terminals, smart phones which are a type of mobile phone terminals, tablet terminals, portable image viewers, digital photo frames, music players, game devices, e-book readers or other household apparatuses, vehicle-mounted apparatuses, medical equipment, electronic binoculars, or the like, which can perform shooting by attaching an external finder.

Further, the present invention is not limited to the camera body and is also applicable to a control device for communicating with a camera (including a network camera) via a wired or wireless communication and remotely controlling the camera. Apparatuses such as a smartphone, which is a type of mobile phone, a tablet PC, a desktop PC, or the like can be given as examples of control apparatuses that remotely control an image capture apparatus. The image capture apparatus can be controlled remotely by the control apparatus communicating commands for carrying out various types of operations, settings to the image capture apparatus, and/or the like on the basis of operations made in the control apparatus, processes carried out by the control apparatus, and the like. Additionally, a live view image shot by the image capture apparatus may be received by the control apparatus through wired or wireless communication and displayed.

Other Embodiment

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-041216, filed Mar. 10, 2020 which is hereby incorporated by reference herein in their entireties.

What is claimed is:

1. An image capture apparatus comprising:
an approach detection sensor configured to detect an eye approaching to a finder;
a touch panel configured to detect a touch operation on a touch operation surface provided outside the finder; and
a memory and at least one processor which function as:
a control unit configured to calculate an amount of a touch area indicating a contact area with the touch panel in the touch operation and control whether to validate the touch operation based on the calculated amount of the touch area, wherein the control unit controls such that:
when the eye approaching to the finder is not made, a touch operation with a calculated amount of a touch area that is less than a first threshold on the touch operation surface is validated, and a touch operation with a calculated amount of a touch area that is not less than the first threshold on the touch operation surface is invalidated, and
when the eye approaching to the finder is made, the touch operation with the calculated amount of the touch area that is not less than the first threshold on the touch operation surface is validated.

2. The apparatus according to claim 1, wherein the control unit controls such that when the approaching to the finder is made, a touch operation with a calculated amount of a touch area that is less than a second threshold that is larger than the first threshold to the touch operation surface is validated, and a touch operation with a calculated amount of a touch area that is not less than the second threshold to the touch operation surface is invalidated.

3. The apparatus according to claim 2, wherein the approach detection sensor is capable of detecting the eye approaching distance to the finder,
when the eye approaching distance is longer than a first distance, the control unit sets a threshold to the first threshold,
when the eye approaching distance is a second distance or less that is shorter than the first distance, the control unit sets the threshold to the second threshold, and
when the eye approaching distance is between the first distance and the second distance, the control unit sets the threshold to a third threshold that is larger than the first threshold and less than the second threshold, and invalidates the touch operation with the calculated amount of the touch area that is not less than the set threshold.

4. The apparatus according to claim 3, wherein in a mode in which a detection sensitivity of the touch operation is increased, values of the first threshold, the second threshold and the third threshold are changed to be larger than the thresholds when the image capture apparatus is not in the mode.

5. The apparatus according to claim 1, wherein the control unit controls such that when the approaching to the finder is made, the invalidation of the touch operation based on the calculated amount of the touch area of the touch operation on the touch operation surface is not performed.

6. The apparatus according to claim 1, wherein the touch operation surface is a display surface capable of displaying a captured image.

7. The apparatus according to claim 1, wherein the control unit executes predetermined processing in accordance with a valid touch operation regardless of an approaching state or a non-approaching state.

8. The apparatus according to claim 7, wherein the predetermined processing is processing for determining a focus adjustment position or a tracking target position.

9. The image capture apparatus of claim 1, wherein the control unit is configured to, when the approaching to the finder is made, validate the touch operation on any portion of the touch panel when the calculated amount of the touch area of the touch operation is less than the first threshold.

10. The image capture apparatus of claim 1, wherein the amount of the touch area is calculated based on a number of sensor intersection points associated with the touch panel where an amount of change in capacitance is detected.

11. A method of controlling an image capture apparatus having an approach detection sensor configured to detect an eye approaching to a finder, and a touch panel configured to detect a touch operation on a touch operation surface provided outside the finder, the method comprising:
performing control to calculate an amount of a touch area indicating a contact area with the touch panel in the touch operation, and to determine whether to validate the touch operation based on the calculated amount of the touch area, and to control such that
when the eye approaching to the finder is not made, a touch operation with a calculated amount of the touch area that is less than a first threshold on the touch operation surface is validated, and a touch operation with a calculated amount of the touch area that is not less than the first threshold on the touch operation surface is invalidated, and
when the eye approaching to the finder is made, the touch operation with the calculated amount of the touch area that is not less than the first threshold on the touch operation surface is validated.

12. A non-transitory computer-readable storage medium storing a program for causing a computer to function as the following units of an image capture apparatus, wherein an approach detection sensor is configured to detect an eye approaching to a finder, a touch panel is configured to detect a touch operation on a touch operation surface provided outside the finder, and a control unit is configured to perform control to calculate an amount of a touch area indicating a contact area with the touch panel in the touch operation, to determine whether to validate the touch operation based on the calculated amount of the touch area, and to control such that
- when the eye approaching to the finder is not made, a touch operation with a calculated amount of a touch area that is less than a first threshold on the touch operation surface is validated, and a touch operation with a calculated amount of a touch area that is not less than the first threshold on the touch operation surface is invalidated, and
- when the eye approaching to the finder is made, the touch operation with the calculated amount of the touch area that is not less than the first threshold on the touch operation surface is validated.

* * * * *